UNITED STATES PATENT OFFICE.

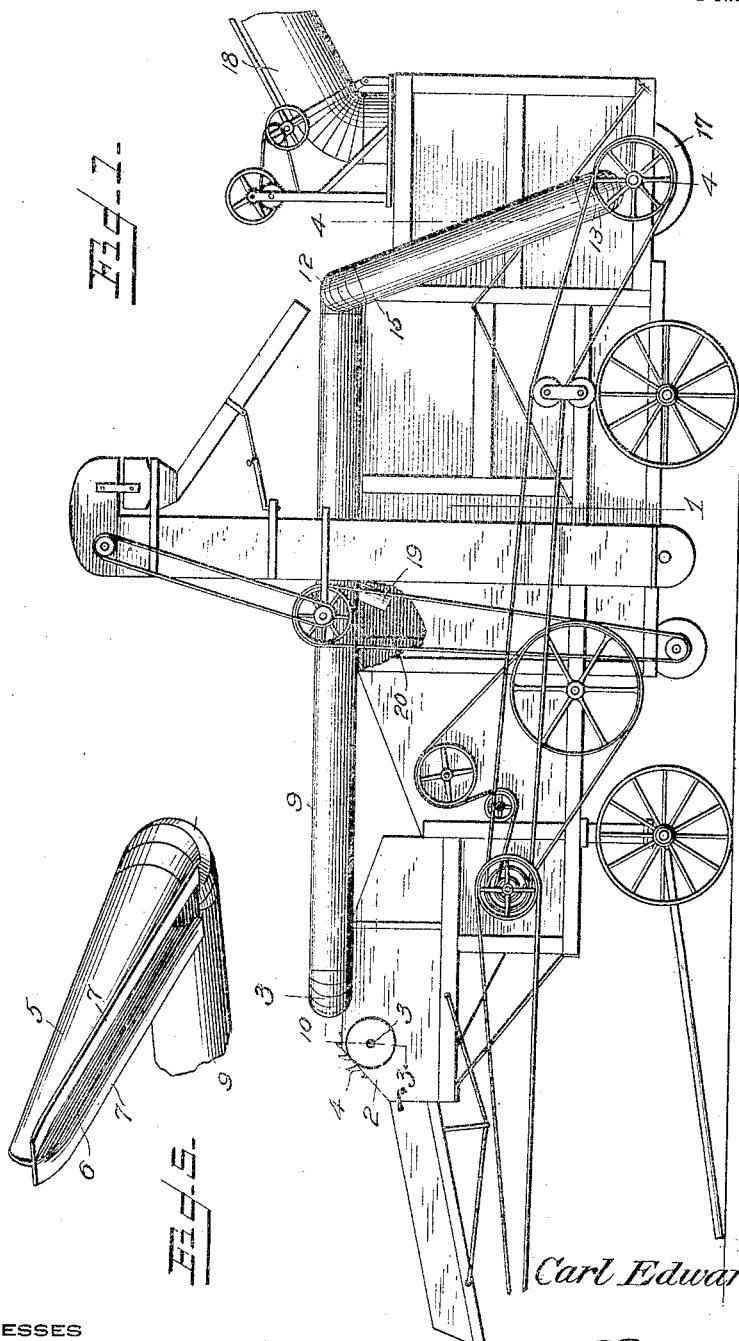

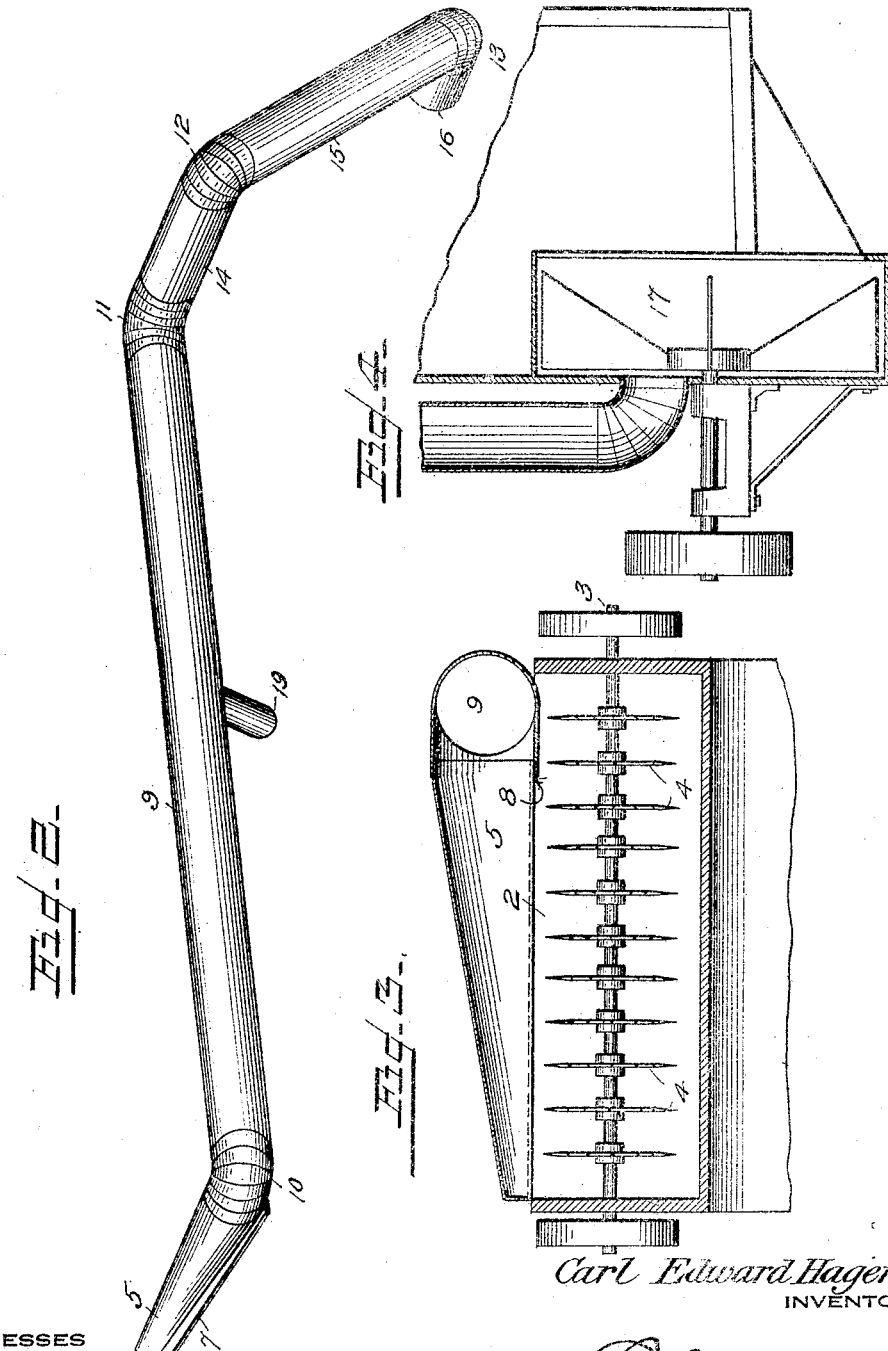

CARL EDWARD HAGEN, OF PELICAN RAPIDS, MINNESOTA.

DUST-REMOVER FOR THRESHING-MACHINES.

1,368,140.      Specification of Letters Patent.      Patented Feb. 8, 1921.

Application filed February 7, 1920. Serial No. 356,816.

*To all whom it may concern:*

Be it known that I, CARL EDWARD HAGEN, a citizen of the United States, residing at Pelican Rapids, in the county of Ottertail and State of Minnesota, have invented a new and useful Dust-Remover for Threshing-Machines, of which the following is a specification.

This invention has reference to dust removers for threshing machines, and its object is to remove the dust from the space or chamber occupied by the band cutters and from the portion of the machine immediately back of the grain canvas apron to the rear of the threshing cylinder.

In accordance with the invention, the threshing machine is provided with a pipe or tube connected with the casing between the band cutters and the cylinder, which pipe is carried along the casing to an intermediate portion of the length of the latter to a point a short distance to the rear of the canvas apron provided in many threshing machines and ultimately communicates with the air intake of the customary suction blower at the rear of the machine so that there is produced a suitable draft through the pipe withdrawing the dust-laden air from points in the machine where the dust is liable to become very thick. Such dust released from the grain by the band cutters and threshing cylinder is both annoying and injurious to the operator feeding the bundles to the threshing cylinder, but by means of the invention the injurious effects upon the operator are eliminated and the grain is delivered in a cleaner condition than is usual.

The invention will be best understood from a consideration of the following detailed description taken in connection with the accompanying drawings forming part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figure 1 is an elevation of a threshing machine equipped with the invention, certain parts being broken away and in section.

Fig. 2 is a perspective view of the pipe or duct embodying the invention and constituting an attachment or adjunct to the threshing machine.

Fig. 3 is a section on the line 3—3 of Fig. 1.

Fig. 4 is a section on the line 4—4 of Fig. 1.

Fig. 5 is a perspective view of the forward end of the suction duct shown in Fig. 2, with the point of view below the bottom of the duct.

Referring to the drawings, there is shown a threshing machine 1 which may be of any suitable type but is not described in detail since the specific construction of the machine forms no part of the invention.

At the forward end of the threshing machine, which is suitably incased, there is a chamber 2 traversed by a shaft 3 upon which are mounted a suitable number of band cutters 4, all of which may be of ordinary construction. Within the casing of the threshing machine, it may be assumed that the usual threshing cylinder is installed, but this has not been shown in the drawings. Extending across the top of the casing over the chamber 2 is a dust-collecting nozzle 5 having a longitudinal opening or mouth 6 with flanges 7 on opposite sides, whereby the mouth 6 may be made to fit over an opening 8 extending crosswise of the chamber 2. The nozzle 5 tapers from one end toward the other, at which latter end it is closed and at the other or large end communicates with a pipe or tube 9 to which it is connected by an elbow 10, and from which elbow the pipe extends to near the rear end of the machine where it is connected by other elbows 11, 12 and 13 and pipe sections 14, 15 and 16 to the air intake of a suction fan 17 of any approved form near the rear end of the machine and delivering air into a pneumatic stacker 18 of ordinary construction.

The pipe 9, at an intermediate point, has a branch 19 leading into the interior of the casing of the machine at a point a few inches back of a canvas apron 20 within the casing, with which certain types of threshing machines are customarily provided.

The suction fan 17 is driven in any suitable manner from the driving power unit of a thresher and creates a suction draft through the pipe 9 and its continuations and adjuncts, thereby drawing air through the branch pipe 19 and through the nozzle 5, so that dust-laden air is withdrawn constantly from the interior of the casing of the machine back of the canvas 20 and through the mouth 6 of the nozzle 5 between the band cutters 14 and the threshing cylinder, whereby the chamber 2, ordinarily heavily dust-laden because of the action of the band cutters 4 and the threshing cylinder, is kept relatively free from dust. Because of such conditions, an operator feeding bundles of grain to the threshing cylinder is not subjected to the effects of clouds of dust issuing from the feeding end of the machine and consequently is freed from the harmful effects of such dust. Moreover, the interior of the machine is kept markedly free from dust heretofore discharged from the bundles of grain and from the straw, so that the grain when separated from the straw is delivered in a markedly clean condition. The invention, therefore, contributes to the health of the workmen and to the cleanliness of the product of the machine.

What is claimed is:

1. The combination with a threshing machine, of a duct having at one end a suction fan to cause a stream of air through the duct and at the other end a nozzle communicating with the interior of the machine to the rear of the band cutters and extending transversely of the machine.

2. The combination with a threshing machine, of a duct having at one end a suction fan to cause a stream of air through the duct and at the other end a nozzle communicating with the interior of the machine to the rear of the band cutters and extending transversely of the machine, said duct having a branch pipe entering the interior of the machine adjacent and to the rear of the canvas apron located within the casing of the machine.

3. The combination with a threshing machine, of a pipe or duct communicating with the interior of the machine at the rear of and adjacent to the band cutters thereof and extending therefrom to the rear of the machine at a low point thereof, and a suction fan connected to the duct at said low point for causing a stream of air to flow through the duct from the front end portion of the machine adjacent to the band cutters.

4. The combination with a threshing machine, of a pipe or duct communicating with the interior of the machine at the rear of and adjacent to the band cutters thereof and extending therefrom to the rear of the machine at a low point thereof, means for causing a stream of air to flow through the duct from the front end portion of the machine adjacent to the band cutters, said pipe having a forward nozzle communicating therewith and tapering away from the pipe with the outer end closed, and an open mouth at the bottom of the nozzle communicating throughout its length with the interior of the machine adjacent to the band cutters.

5. The combination with a threshing machine provided with band cutters, of a suction pipe having a forward nozzle extremity communicating with the interior of the machine adjacent and to the rear of the band cutters, the nozzle extremity being closed at the outer end and tapering theretoward and and having a longitudinal mouth with side flanges for attachment to the casing of the machine, said nozzle extending transversely of the machine from one side to the other for the width of the space occupied by the band cutters.

6. In a threshing machine, a suction duct having a nozzle or mouth end communicating with the band-cutter chamber of the machine throughout the breadth thereof whereby the dust discharged from the material being treated by the cutting of the bands and the threshing of the grain is withdrawn from the neighborhood of the feeding end of the machine through said suction duct.

7. The combination with a threshing machine having band cutters and a pneumatic stacker, and a suction fan at the rear end delivering air to said stacker, of a pipe arranged longitudinally along the outside of the machine from the band cutters to the fan, and having its rear end communicating with the inlet of said fan, and a dust collecting nozzle at the front end of the pipe, said nozzle being arranged transversely of the machine in rear of the band cutters with its mouth facing the interior thereof.

In testimony that I claim the foregoing as my own I have hereto affixed my signature.

CARL EDWARD HAGEN.